United States Patent
Bernard et al.

(10) Patent No.: US 6,649,557 B1
(45) Date of Patent: Nov. 18, 2003

(54) USE OF TIN DERIVATIVES AS LATENT POLYCONDENSATION CATALYSTS, AND PREMIX CONTAINING THEM

(75) Inventors: Jean-Marie Bernard, Mornant (FR); Jean-Marc Frances, Villeurbanne (FR); Bernard Jousseaume, Talence (FR); Nicholas Noiret, Chevaigne (FR); Michel Pereyre, Talence (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 243 days.

(21) Appl. No.: 09/671,529

(22) Filed: Sep. 27, 2000

Related U.S. Application Data

(63) Continuation of application No. 08/687,554, filed as application No. PCT/FR95/00158 on Feb. 10, 1995, now Pat. No. 6,187,711.

(30) Foreign Application Priority Data

Feb. 11, 1994 (FR) .............................................. 94 01561

(51) Int. Cl.[7] .................. B01J 31/12; B01J 23/14; C08G 18/24; C08G 18/80

(52) U.S. Cl. ...................... 502/152; 502/156; 502/171; 502/352; 528/45; 528/58

(58) Field of Search ................................. 502/152, 171, 502/156, 352

(56) References Cited

U.S. PATENT DOCUMENTS 4,549,945 A * 10/1985 Lindstrom .................. 521/126
6,187,711 B1 * 2/2001 Bernard et al. ............. 502/152

* cited by examiner

*Primary Examiner*—Rabon Sergent

(57) ABSTRACT

Tin derivatives for use as oxygen-activated latent polycondensation catalysts. According to the invention, said tin derivatives have at least one tin-tin bond of the formula (I): $R_1-Y_n-R_4$ wherein $R_1$ and $R_4$ which can be the same or different, are selected from hydrogen, and advantageously from the hydrocarbon radicals or together form a divalent radical or a single ring forming-bond; wherein n is at least equal to 2; wherein the Y, which are the same or different, stand for a stannic grouping having the structure (s): R' and R", which can be the same or different, are selected from hydrogen and advantageously from the hydrocarbon radicals. Application to paints.

15 Claims, No Drawings

USE OF TIN DERIVATIVES AS LATENT POLYCONDENSATION CATALYSTS, AND PREMIX CONTAINING THEM

This application is a Continuation Application of U.S. application Ser. No. 08/687,554, filed on Oct. 7, 1996, now U.S. Pat. No. 6,187,711 which is an application under 35 U.S.C. Section 371 of International Application Number PCT/FR95/00158, filed Feb. 10, 1995.

The present invention relates to the use of tin derivatives as latent polycondensation catalysts. The invention relates more particularly to the use of tin derivatives having tin-tin bonds.

The use of tin salts as polycondensation catalysts has been known for several decades.

These derivatives are used in particular for the condensation of silicones and for the production of polyurethane.

In the course of the last few years one application has become increasingly prevalent, namely the marketing of premixes which are capable, on the one hand, of being stored for a long time and, on the other hand, of being able to give the desired polymer, or polycondensate, as quickly as possible under the implementation conditions.

These conditions are generally antinomic. For this reason, very few catalysts have been developed in this field.

Accordingly, one of the aims of the present invention is to find tin derivatives which are inert or relatively inactive as catalysts under the storage conditions.

Another aim of the present invention is to find tin compounds of the above type which, when placed under the conditions of implementation of premixes, undergo a conversion to give derivatives which are active under these conditions.

Another aim of the present invention is to provide novel tin derivatives which have the above characteristics.

Another aim of the present invention is to provide tin derivatives which are active as polycondensation catalysts and which are derived from the above derivatives.

Another aim of the present invention is to provide premixes which are capable of giving silicones and polyurethanes which are both inert under the storage conditions and become condensed under the conditions of application.

These aims and others which will appear later are achieved by means of the use of tin derivatives which have at least one tin-tin bond and which have no tin-chalcogen-tin bonding sequences and preferably having no tin-(metalloid of column V, VI, VII)-tin bonding sequences as latent polycondensation catalysts, which can be activated by oxygen. The Periodic Table used corresponds to that published in the Bulletin of the French Chemical Society in its supplement No. 1 dated January 1966.

Indeed, it has been demonstrated, entirely surprisingly, in the course of the study which led to the present invention, that when these derivatives were subjected to the action of oxygen (in particular to that of atmospheric oxygen), they led to derivatives having a high catalytic capacity for polycondensation, and in particular for unmasking, this being despite the fact that the compounds with tin-tin bonding possessed little or no such capacity.

The oxygen may also be provided by oxidation agents bearing oxygen atom(s), such as halogenate (iodate, etc.), peroxide, mixed or non-mixed, of metals (such as oxylith: Na—O—O—Na), of hydrogen and of hydrocarbon radicals, in general of alkyl and/or acyl radicals; it is, however, preferable for the oxygen to be provided in gaseous form ($O_2$, or even $O_3$) and in particular in atmosphere (air) form.

When they are not cyclic, it is desirable for these derivatives to have at least one single (monovalent) bond of tin-chalcogen(-carbon), advantageously tin-oxygen(-carbon), type.

The compounds with tin-tin bonding advantageously have the general formula (I):

$$R_1\text{—}Y_n\text{—}R_4 \tag{I}$$

where $R_1$ and $R_4$ which may
 be similar or different and be chosen from hydrogen, advantageously from hydrocarbon radicals,
or
together form a divalent radical or a single bond which ensures the formation of a ring:
where n is at least equal to 2:
where the groups Y, which may be similar or different, represent a tin-membered chain unit of structure:

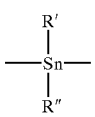

R' and R", which may be similar or different, are chosen from hydrogen and, advantageously, hydrocarbon radicals.

When the compounds are cyclic, it is highly preferably for them to be 5-, 6- or 7-membered or a mixture of such rings.

If it is desired to distinguish between the chain units, a representation may be used which uses the $_j$ row of the chain unit in the sequence, where the $_j$s cross from left to right.

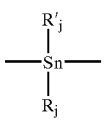

$_j$ then takes all the integer values from 1 to n, including the limits:

Thus, by way of exemplary example, when n is equal to 4 and $_j$ takes all the values from 1 to 4, the formula may develop as follows:

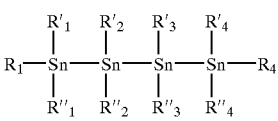

$R_j$ and $R_j$, which may be similar or different, are chosen from hydrogen and, advantageously, hydrocarbon radicals.

$R_1$ and $R_4$ are advantageously chosen from aryls, alkyls, alkoxyls, silyls and silyloxyls, preferably acyloxyls.

$R_1$ and $R_4$ may also be chosen from those corresponding to the anions of acids having both a hydrocarbon radical and an oxygen-containing acidic function of inorganic nature. Examples of these families may be sulphonic acids, alkyl monophosphates, alkyl phosphates, and phosphonates and phosphinates which may be partially esterified.

n is advantageously not more than 10, preferably between 2 and 8. n is an integer unless it is desired to give a statistical value of the number of tin-membered chain units for a mixture of various derivatives according to the present invention.

When $R_1$ and $R_4$ together constitute a bond which makes it possible to form a cyclic derivative, n is equal to at least 3 and is advantageously chosen between 5 and 7, preferably equal to 6, or corresponds to a mixture of 5- and 6-membered derivatives.

When R' and R" are chosen from hydrocarbon radicals, these radicals are advantageously chosen from aryls, alkyls, including aralkyls, silyls, alkoxyls, and silyloxyls.

The choice of radicals depends on the property which it is desired to emphasize. If it is desired to limit the catalytic activity of the starting compound to the maximum or if it is desired to limit the risks of an untimely oxidation to the maximum, it is desirable to have compounds whose radicals are of high steric bulk in order to protect access to the tin.

Thus, it is desirable for at least one of the radicals $R_1$ and $R_4$, and preferably both, to have branching alpha, beta or gamma to the tin.

This branching may be branching corresponding to a tertiary carbon when it is strongly desired to avoid any untimely action during storage of the compound of the present invention.

Branches may also be borne by the radicals R' and R". It may be advantageous for only one of the two radicals R' and R" to have branching, this being for each of the chain units.

If a lower reactivity is desired relative to that of the derivatives containing alkyl substituents, the alkyl radicals may be replaced by aryl radicals. It should be noted that the bulk of an aryl radical may be increased by substituting at least one of the positions ortho to the carbon-tin bond.

However, in general, it is preferable for the substituents R' and R" not to be all aryl radicals, advantageously not more than half.

If, on the other hand, it is desired to increase the reactivity of the compound, it is preferable for at least one of the radicals $R_1$ or $R_4$ to be a group attached via a chalcogen, preferably an oxygen, to tin: the groups $R_1$ and/or $R_4$ are thus advantageously alkoxyls or equivalents, preferably acyloxyl(s) or equivalents.

In order to avoid weighting down the catalyst precursor molecule, it is preferable to limit the number of carbons to 50 (only one significant figure), preferably to 30 (only one significant figure) carbon atoms per tin atom contained in the molecule.

It is also advantageous for each of the radicals to have not more than 20 (one significant figure), preferably 10 (only one significant figure), carbon atoms.

Among the compounds giving very good results, mention should be made of compounds in which $R_1$ and advantageously $R_4$ are advantageously branched on the carbon vicinal or antevicinal to the carbonyl function and in which n is equal to 2; the other radicals advantageously being chosen from aryls and alkyls, preferably with not more than 2 aryls and, more preferably, none.

In the present description, the term alkyl is taken in its etymological sense, that is to say that it corresponds to the radical formed from an alcohol whose OH function has been removed.

Another particularly satisfactory family consists of the compounds of formula I where $R_1$ and $R_4$ together form a single bond such that the compounds of formula I are cyclic compounds. In this case, n is advantageously between 5 and 7 (including, of course, the limits). In the course of the study which led to the present invention, it was possible not only to demonstrate that the compounds of formula I were capable of generating in situ compounds of high catalytic activity for polycondensation, but also to identify some of the products having good catalytic activity.

Thus, it was possible to demonstrate that the components derived from formula I by oxidation, and in particular by insertion of oxygen between two tin atoms, were of high catalytic activity, in particular those of formula II $$R_1-(Q)_n-R_4 \quad (II)$$

where the radicals have the same value as in formula (I) above, and where Q is a divalent chain unit of structure —Z—Y— with Y of the same definition as in formula (I) and where Z either represents an oxygen atom or simply represents a bond with the preceding chain unit or with $R_1$.

The condition according to which Z represents at least once an oxygen and, when n is greater than 2, at least twice an oxygen must also be satisfied.

If we again take the representation using the row of the chain unit $_j$, $Q_j$ may be represented by:

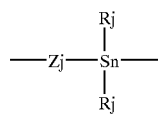

and $_j$ takes all the values from 1 to n with the condition that when the row $_j$ corresponds to 1, Z represents only the bond between the tin of row 1 and the radical $R_1$, it being possible for Z to be an oxygen or a single bond when $_j$ is other than 1.

When n is greater than 2, these compounds have a tendency to be converted into organotin derivatives in which at least one of the tin atoms is attached twice to an oxygen atom (for example: $^{-O}$>Sn<$^{O-}$; >Sn=O; the bonds left open with the tin being bonds with the radicals $R_5$ and $R_6$).

These said organotins attached twice to oxygen are reputed to be both amorphous and insoluble. They give in situ derivatives of the dialkoxy- or diaminodiorganostannane type which prove to be catalysts of high quality.

The organic radicals ($R_5$ and $R_6$) corresponding in particular to the diorganotin oxides are derived (often unchanged) from the radicals already present in the initial molecule and usually from the radicals R' and R" and preferably from hydrocarbon radicals attached to the tin by a carbon atom.

Thus, according to the present invention, a novel category of polycondensation catalyst has been found, the formula of which corresponds to that of dialkoxydiorganostannanes in which the two "organo" groups correspond to R' and R". It is preferable in this case, as in the other cases, for the number of carbons in R' and R" to be greater than 1, preferably greater than 2.

As has been mentioned above, another aim of the present invention is to provide compositions, or premixes, which are stable on storage and which polycondense readily under the conditions of use.

This aim is achieved by means of a composition containing at least one polycondensable compound and at least one compound of formula:

$$R_1-Y_n-R_4 \quad (I)$$

In this formula, $R_1$ and $R_4$, which may be similar or different, are derivatives chosen from hydrogen or hydrocarbon radicals or together form a divalent radical or a single bond which ensures formation of a ring;

n is at least equal to 2;

the groups Y, which may be similar or different, represent a tin-membered chain unit of structure

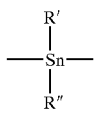

R' and R", which may be similar or different, are chosen from hydrogen and hydrocarbon radicals.

Among the polycondensable compounds which should be mentioned are alcohols, advantageously diols, usually polyols, and amines, advantageously diamines, usually polyamines. The formulations based on di- or polyvalent alcohols, known to those skilled in the field of polyurethanes, are perfectly suitable.

As regards the (poly)amines, care should be taken in their use. Indeed, on the one hand, amines are often very reactive "per se" and, on the other hand, they may catalyse the release of masked isocyanates. In this case, only amines which do not catalyse the release of masked isocyanates should be chosen.

Compositions capable of using the latent catalysts according to the invention which may also be mentioned are:
silicone oils and precursors thereof,
silicone compositions known to be capable of crosslinking by condensation reactions capable of being catalysed by a tin catalyst.

Among these silicone compositions, mention may be made in particular of compositions containing one or two packages capable of crosslinking into an elastomer, and coating compositions packaged in bulk, in solvent or in aqueous emulsion, which are capable of crosslinking into an elastomeric coating film.

In a more detailed manner mention may be made of any polysiloxane capable of employing condensations of SiH/SiOH and SiOH/SiOR type.

Thus, as regards the SiH/SiOH condensations, the present invention is directed towards compositions containing, besides at least one latent catalyst according to the present invention, at least one of the following constituents:
at least one derivative containing SiH functions;
at least one derivative containing SiOH functions;
optionally at least one solvent for the said derivative(s) containing SiH functions and/or derivative(s) containing SiOH functions;
optionally water, where appropriate in the form of a continuous aqueous phase;
optionally an effective amount of at least one agent for inhibiting gel formation at the storage temperature of the said composition.

As derivatives containing SiH functions, the invention is directed above all towards organohydrogenopolysiloxanes having, per molecule, at least 2, advantageously at least 3 hydrogen atoms directly attached to the silicon atoms and corresponding to the average general formula $$R_xH_ySiO_{(4-x-y)/2}$$

in which formula
the symbol R represents identical or different alkyl or aryl radicals containing from 1 to 8 carbon atoms, or vinyl radicals, at least 80% in numerical terms of the said radicals being methyl radicals;
the symbol x represents any number ranging from 1 to 1.99;
the symbol y represents any number ranging from 0.1 to 1;
the symbol x+y ranging from 1.7 to 2.6.

The derivative containing SiX functions may be linear, branched or cyclic; for economic reasons, its viscosity is preferably less than 100 mPa s; the identical or different organic radicals are preferably methyl, ethyl and/or phenyl.

When this derivative is linear, the hydrogen atoms of the SiH functions are attached directly to the silicon atoms located at the end(s) of the chain and/or in the chain.

Examples of derivatives containing linear SiH functions which may be mentioned are polymethylhydrogenosiloxanes containing trimethylsiloxy ends and polydimethylpolymethylhydrogenosiloxanes containing trimethylsiloxy and/or hydrogenodimethylsiloxy ends. Among the cyclic polymers which may be mentioned are those corresponding to the following formulae:

$[OSi(CH_3)H]_4$; $[OSi(CH_3)H]_5$; $[OSi(CH_3)H]_3$;

$[OSi(CH_3)H]_6$; $\{[OSi(CH_3)H]_3[OSi(CH=CH_2)CH_3]\}$;

$[OSi(C_2H_5)H]_3$

Concrete examples of branched polymers which may be mentioned are:

$CH_3Si[OSi(CH_3)_2H]_3$; $Si[OSi(CH_3)_2]_4$;

$C_3H_7Si[OSi(CH_3)2H]_3$ $HSi[OSi(CH_3)_3][OSi(CH_3)_2H]_2$;

$Si[OSi(CH_3)(C_2H_5)H][OSi(CH_3)_2H]_3$ as well as those consisting of $SiO_2$ and $H(CH_3)_2SiO_{0.5}$ units with a $CH_3/Si$ ratio of 1 to 1.5.

As derivative(s) containing SiOH functions, the invention is directed above all towards (hydroxy)organopolysiloxanes having at least two SiOH functions, in general α,ω-bis(hydroxy)organopolysiloxanes and organopolysiloxane resins containing from 0.02 to 0.2 silanol function per 100 g of resin, optionally as a mixture with α,ω-bis(hydroxy) organopolysiloxane gums, the identical or different organic groups being alkyl or vinyl radicals containing from 1 to 8 carbon atoms or aryl radicals of not more than 10 carbon atoms. The derivative containing SiOH functions may have a viscosity which may be up to 200,000 mPa s; for economic reasons, a constituent whose viscosity is generally from about 20 to 10,000 mPa s is chosen.

The identical or different organic groups generally present in the generally α,ω-, di- or polyhydroxylated oils or gums are methyl, ethyl, phenyl, vinyl or trifluoropropyl radicals. Preferably at least 80% in numerical terms of the said organic groups are methyl groups attached directly to the silicon atoms.

The resins containing silanol functions advantageously have at least one of the $R'_3SiO_{0.5}$ (unit M) and $R'_2SiO$ (unit D) units per molecule, in combination with at least one of the $R'SiO_{1.5}$ (unit T) and $SiO_2$ (unit Q) units. The radicals R' generally present are methyl, ethyl, isopropyl, tert-butyl and n-hexyl. Examples of resins which may be mentioned are the resins MQ, MDQ, TD and MDT.

Among the possible solvents for the derivative(s) containing SiOH functions and/or for the derivative(s) containing SiH functions, which make it possible to control the viscosity of the composition, mention may be made of standard solvents for silicone polymers such as, for example, solvents of aromatic type (xylene, toluene, etc.) or saturated aliphatic type (hexane, heptane, white spirit, tetrahydrofuran, diethyl ether, etc.) and chlorinated solvents (methylene chloride, perchloroethylene, etc.).

As a guide, it may be mentioned that the ratio of the number of SiH functions of the derivative containing SiH functions to the number of SiOH functions of the derivative containing SiOH functions being from about 1/1 to 100/1, preferably from about 10/1 to 30/1.

As regards the SiOH/SiX, in general SiOH/SiOR condensations, the present invention is directed towards compositions containing, besides at least one latent catalyst according to the present invention, at least one of the following constituents:

at least one derivative containing SiOH functions;
at least one derivative containing SiX functions where X is a hydrolysable group generally of type OR;
optionally at least one solvent for the said derivative(s) containing SiH functions and/or derivative(s) containing SiOH functions;
optionally water, where appropriate in the form of a continuous aqueous phase;
optionally an effective amount of at least one agent for inhibiting gel formation at the storage temperature of the said composition.

The above derivatives have already been described, with the exception of the derivatives of type SiX.

Advantageously, these derivatives have the formula R Si $X_3$ or Si $X_4$, where R has the definition given below and X represents a hydrolysable group.

Among the hydrocarbon radicals R which may be mentioned are the radicals:

methyl, ethyl, propyl, 3,3,3-trifluoropropyl, cyclohexyl, cyanoethyl, etc.,
vinyl, allyl, butenyl, etc.,
phenyl, chlorophenyl, etc., The derivative containing SiX functions has at least one hydrolysable group such as:

acyloxy of formula —O—CO R'
alkoxy of formula —O—R'
amino of formula —$NR^1R^2$
amido of formula —$NR^1COR^2$
alkenyloxy of formula —O—$CR^1$=$CHR^2$
aminoxy of formula —O—$NR^1R^2$
ketiminoxy of formula —O—N=$CR^1R^2$ or

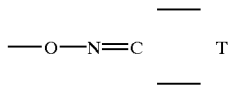

where R' represents an alkyl or aryl radical having from 1 to 15 carbon atoms, $R^1$ and $R^2$, which may be identical or different, represent alkyl or aryl radicals containing from 1 to 8 carbon atoms and T represents an alkylene radical containing from 4 to 8 carbon atoms. Among the radicals R', $R^1$ and $R^2$ which may be mentioned most particularly are the methyl, ethyl, cyclohexyl, phenyl, etc. radicals.

Among the radicals T which may be mentioned most particularly are those of formula —$(CH_2)_4$—; —$(CH_2)_5$—; —$(CH_2)_6$—, etc.

The derivatives containing SiX functions preferably used are alkoxysilanes and ketiminoxysilanes.

Examples of alkoxysilanes which may be mentioned are those of formula $CH_3Si(OCH_3)_3$  $CH_3Si(OC_2H_5)_3$  $C_2H_5Si(OCH_3)_3$ $CH_2$=$CHSi(OCH_3)_3$  $CH_2$=$CHSi(OCH_2$—$CH_2$—$OCH_3)_3$ $C_6H_5Si(OCH_3)_3$  $CH_3Si(OCH_3)_2OCH(CH_3)$—$CH_2$—$OCH_3$ $Si(OCH_3)_4$  $Si(OC_2H_5)_4$  $Si(OC_3H_7)_4$ Examples of ketiminoxysilanes which may be mentioned are those of formula $CH_3Si[ON$=$C(CH_3)_2]_3$ $CH_3Si[ON$=$C(CH_3)C_2H_5]_3$ $CH_2$=$CHSi[ON$=$C(CH_3)C_2H_5]_3$ $C_6H_5Si[ON$=$C(CH_3)_2]_3$ $CH_3Si(ON$=$C(C_2H_5)(CH_2)_3CH_3]_3$ $(CH_3)_2C$=$NOSi[ON$=$C(CH_3)C_2H_5]_3$ $CH_3Si[ON$=$C(CH_3)CH(C_2H_5)(CH_2)_3CH_3]_2$

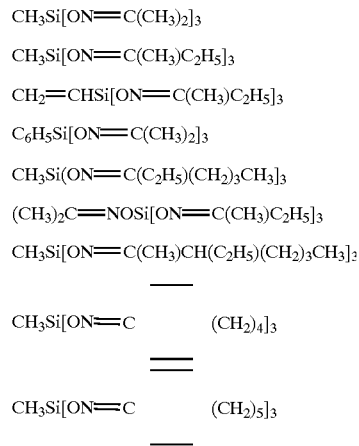

The derivatives containing acyloxysilane SiX functions are also advantageous.

Examples of acyloxysilanes which may be mentioned are those of formula $CH_3Si(OCOCH_3)_3$ $C_2H_5Si(OCOCH_3)_3$ $CH_2$=$CHSi(OCOCH_3)_3$ $C_6H_5Si(OCOCH_3)_3$ $CH_3Si[OCOCH(C_2H_5)$—$(CH_2)_3$—$CH_3]$ $CF_3CH_2CH_2Si(OCOC_6H_5)_3$ $CH_3Si(OCOCH_3)_2(OCOH(C_2H_5)$—$(CH_2)_3$-$CH_3$ $CH_3COOSi[OCOCH(C_2H_5)$—$(CH_2)_3$-$CH_3]_3$ The advantage of compositions containing a latent catalyst according to the invention should also be mentioned for the manufacture of polyurethane(s), in particular for paint. Thus, among the polycondensable, and in particular crosslinkable, compounds which should be mentioned particularly are isocyanates, advantageously diisocyanates, preferably polyisocyanates, whether masked or unmasked.

Particular mention should be made of derivatives bearing at least one isocyanate function in which the nitrogen is attached to an aliphatic carbon (that is to say one of $sp^3$ hybridization) and advantageously bearing one, preferably two hydrogen atom(s), which are often more difficult to crosslink and/or to polycondense than those in which the nitrogen is attached to a carbon of aromatic nature. This distinction may be important in the case of masked isocyanates.

Among the various isocyanates which may be mentioned are those which are totally or only partially masked, and isocyanates which consist of mixtures may also be used. The constituents of these mixtures may be masked or free isocyanates. Among the isocyanates showing a particular advantage which may be mentioned, for example, are:

precondensates of monomers of diisocyanates with a polyol preferably containing at least three alcohol functions;
oligomers containing isocyanurate rings (trimers and/or pentamers);
dimers;
and derivatives containing biuret functionality.

The masking groups are groups well known to those skilled in the art and are derived from compounds containing labile hydrogen, and groups which can be displaced by alcohols at a temperature advantageously between 80 and 200° C., preferably between 100 (two significant figures) and 150° C. These values are meant as a reply to the 1-octanol test, explained later, that is to say that they correspond to the lowest temperature value which makes it possible to obtain at least 90% absorption of octanol (that is to say release of at least 90% of the masking agent).

The composition according to the present invention may advantageously contain, on the one hand, a (poly) isocyanate, preferably a masked one, and, on the other hand, formulations, of the (poly)ol or (poly)amine type as mentioned above, these formulations being capable of condensing with the above isocyanates.

Mention should also be made of the fact that it is possible to accelerate the oxidation of the compounds of formula I by subjecting them to actinic radiation in the visible or ultraviolet range. This property is particularly advantageous since it gives a means of accelerating the activation of latent catalysts if such a need is felt.

It should also be mentioned that it is preferable to store the compositions according to the present invention in the absence of light.

It should also be emphasized that the compounds of formula I according to the present invention may be placed in contact with phases containing water on condition that the latter phase is also well-deoxygenated without there being any degradation of the compounds according to the present invention.

Thus, the catalysts of the present invention may be used in all kinds of dispersions and suspensions, or even solutions, having an aqueous nature, that is to say containing a continuous phase having at least 10% water by mass.

Thus, according to an advantageous implementation of the present invention, the latent catalytic compounds according to the present invention may be placed in suspension in an aqueous phase using, preferably, solutions which are well-deoxygenated by any means known to those skilled in the art, and in particular by degassing by means of an inert or reductive gas or a mixture thereof.

It should also be emphasized that certain surfactants used may slow down the migration of the oxygen necessary for activation of the latent catalysts.

This constitutes a particular advantage when it is desired to use, as condensable compounds, compounds placed in suspension in aqueous phase in order to avoid the use of solvents. Thus, according to the present invention, the compounds of formula I may be present in the compositions in the form of a suspension in an aqueous phase.

Another subject of the present invention is a polycondensation process in which a composition, or premix, according to the present invention is used, which is subjected to the action of oxygen optionally in the presence of visible or ultraviolet radiation.

The subject of the present invention is also compositions containing both isocyanates, which are at least partially masked, as a mixture with the compounds according to the present invention.

These mixtures may contain the compounds according to the present invention, in the form of solutions, suspensions, emulsions or powders.

The masking agent used may be either masking agents giving rise to sequences of the urea type (>N—CO—N<), or to sequences of the carbamate type (>N—CO—O—), or even (>N—CO—S—). The most marked catalytic effect, in the Applicant's current state of knowledge, is associated with the release of the sequences of urea type and in particular of the masking agents based on substituted or unsubstituted pyrazole.

The usual masking agents in the field generally give good results with the latent catalysts according to the present invention.

Mention may be made in particular of catalysts masked with derivatives of the pyrazole, oxazole or succinimide type and, in general, those in which the labile hydrogen is borne by a nitrogen; mention may also be made of masking agents of oxime type and, in general, of those in which the labile hydrogen is borne by an oxygen.

Octanol Test

Definition of the Octanol Test

About 5 mmol of protected masked NCO equivalent to be evaluated are placed in a Schott-type tube with magnetic stirring.

2.5 to 3 ml of 1,2-dichlorobenzene (solvent) and the equivalent of 1-octanol (5 mmol, i.e. 0.61 g) are added.

The mixture is heated for 6 h at the temperature considered, so as to unblock the isocyanate functions and thus render them reactive.

The percentage of masked isocyanate function condensed with the 1-octanol is evaluated.

It is considered that the release of an isocyanate is complete when 90% of the octanol is absorbed.

The non-limiting examples which follow illustrate the invention.

Analysis Techniques

Nuclear Macnetic Resonance (NMR)

$^1$H NMR

The proton NMR spectra were recorded with a Perkin-Elmer spectrograph of type R24-B or a Bruker WP-60 spectrograph. For these machines, the samples are prepared in solution in carbon tetrachloride at a concentration of about 30% by mass. Certain spectra were acquired on a Bruker AC 250 machine operating at 250 MHz. In this case, d-chloroform was used as solvent.

For all the spectra, the shifts are given in ppm with tetramethylsilane as internal reference and the couplings are given in hertz.

$^{13}$C NMR

The carbon-13 NMR spectra were recorded on a Bruker AC 250 machine operating at 62.9 MHz. The solvent used is d-chloroform. For all the spectra, the shifts are given in ppm with tetramethylsilane as reference and the couplings are given in hertz.

$^{119}$Sn NMR

The tin NMR spectra were recorded on a Bruker AC 200 machine operating at 74.5 MHz. The solvent used is a benzene/$d_6$-benzene mixture containing 30% $C_6D_6$. For all the spectra, the shifts are given in ppm with tetramethyltin as reference and the couplings are given in hertz.

Mass Spectrometry

The coupled HPLC/mass spectroscopy was performed on a VG AutoSpec Q machine. For this so-called LSIMS (Liquid Secondary Ion Mass Spectroscopy) technique, the ionization is obtained by dynamic (or continuous-flow) FAB (Fast Atom Bombardment). The source is a caesium gun and the matrix employed is 2% glycerol.

Chromatography

In Gas Phase

The analyses by gas chromatography were performed on a Varian 3000 machine. The column used is a capillary column 30 meters in length for a diameter of 320 $\mu$m loaded with dimethylpolysiloxane (0.25 $\mu$m).

In Liquid Phase

The analyses by liquid chromatography were carried out on a Varian 9010 machine fitted with a Waters 991 diode array detector. Various columns were used:

Lichrosorb $C_8$ 10μ (250×4.6 mm) column
Ultrabase $C_8$ 5μ (150×4.6 mm) column
Nucleosil $C_{18}$ 10μ (250×4.6 mm) column Ultrasound The tests were performed using a Sonics & Materials sonicator equipped with a dipping probe.

EXAMPLE 1

Catalytic effect of 1,3-di(acyloxy)tetraalkyldistannoxanes for the SiH/SiOH polycondensation. In this table, $t$-$C_9H_{19}CO_2$ corresponds to a mixture of isomers having a tertiary carbon alpha to the carbonyl function and which corresponds to the mixture known under the name versatic acid (refer to Example VI for the procedure).

The letter C in the tables indicates that this relates to a comparative example which does not belong to the invention.

| Catalyst | | Gel time (min) | Catalyst | Gel time (min) |
|---|---|---|---|---|
| $(n-C_4H_9)_2Sn(O_2CCH_3)_2$ | (C) | 8 | $(n-C_8H_{17})_2Sn(O_2CCH_3)_2$ (C) | 9 |
| $(n-C_4H_9)_2Sn(O_2CCH_3)]_2O$ | | 12 | $[(n-C_8H_{17})_2Sn(O_2CCH_3))]_2O$ | 15 |
| $(n-C_4H_9)_2Sn(O_2CC_{11}H_{23})_2$ (C) | | 9 | $(n-C_8H_{17})_2Sn(O_2CC_{11}H_{23})_2$ (C) | 15 |
| $[(n-C_4H_9)_2Sn(O_2CC_{11}H_{23})]_2O$ | | 35 20 | $[(n-C_8H_{17})_2Sn(O_2CC_{11}H_{23}))]_2O$ | 30 |
| $(n-C_4H_9)_2Sn(O_2CCH(C_2H_5))_2$ | (C) | 45 | $(n-C_8H_{17})_2Sn(O_2CCH(C_2H_5)C_4H_9)_2$ (C) | 15 40 |
| $(n-[(C_4H_9)_2Sn(O_2CCH(C_2H_5))C_4H_9)_2)O$ | | 24 | $[(n-C_8H_{17})_2Sn(O_2CCH(C_2H_5))$-$C_4H_9)_2]_2O$ | 17 |
| $(n-C_4H_9)_2Sn(O_2Ct$-$C_9H_{19})2^{(a)}$ | (C) | | $(n-C_8H_{17})_2Sn(O_2Ct$-$C_9H_{19})_2$ | |
| $[(n-C_4H_9)_2Sn(O_2Ct$-$C_9H_{19})_3]_2O$ | (C) | | | |
| | | | $[(n-C_8H_{17})_2Sn(O_2Ct$-$C_9H_{19})_2]_2O$ | |

(a) Mixture of isomer with a tertiary carbon alpha to the carboxyl.

EXAMPLE 2

Catalytic activity of distannanes and distannoxanes for the SiOH/SiOR and SiH/SiOH couples (refer to Examples V-2 and V-3 for the procedure).

| Catalyst | | SiOH/SiOR Gel time/hours | SiH/SiOH Gel time/minutes |
|---|---|---|---|
| $Bu_2Sn(O_2CCH_3)_2$ | (C) | 1.5 | 8 |
| $[Bu_2Sn(O_2CCH_3)]_2O$ | | 1.2 | 12 |
| $[Bu_2Sn(O_2CCH_3)]_2$ | $(N_2)$ | 45 | 43 |
| $[Bu_2Sn(O_2CCH_3)]_2$ | (air) | 4.5 | 23 |
| $Bu_2Sn(O_2CC_{11}H_{23})_2$ | (c) | 3.2 | 12 |
| $[Bu_2Sn(O_2CC_{11}H_{23})]_2O$ | | 2.7 | 9 |
| $[Bu_2Sn(O_2CC_{11}H_{23})]_2$ | $(N_2)$ | >1.20 | 36 |
| $[Bu_2Sn(O_2CC_{11}H_{23})]_2$ | (air) | 8.5 | 26 |

EXAMPLE 3

Catalysis of polyisocyanate to give polyurethanes (refer to Example V-4 for the procedure).

| Catalyst | | Gel time |
|---|---|---|
| $Bu_2Sn(O_2CCH(C_2H_5)_4H_9)_2$ | | 14 |
| $[Bu_2Sn(O_2CCH(C_2H_5)C_4H_9)]_2O$ | | 20 |
| $[Bu_2Sn(O_2CCH(C_2H_5)C_4H_9)]_2$ | $(N_2)$ | 150 |
| $[Bu_2Sn(O_2CCH(C_2H_5)C_4H_9)]_2$ | (air) | 30 |
| No catalyst (blank) | | 500 |

EXAMPLE 4

Synthesis of cyclopoly(dialkylstannanes) by decomposition of dialkylstannane(s) catalysed by palladium: case of dibutylstannane.

| Solvent | T(° C.) | t(h) | Yield (%) | $Sn_5/Sn_6$ |
|---|---|---|---|---|
| Pentane | 15 | 12 | 95 | 90/10 |
| Silicone | 20 | 6 | 80 | 70/30 |
| THF | −50 | 2 | 95 | (a) |

-continued

| Solvent | T(° C.) | t(h) | Yield (%) | $Sn_5/Sn_6$ |
|---|---|---|---|---|
| | 15 | 0.5 | 95 | 80/20 |
| | 50 | 0.2 | 90 | 70/30 |

EXAMPLE 5

Preparation of polydialkylpolystannanes from $R_2SnCl_2$.

| $R_2SnCl_2$ | Metal | Activation | T(° C.) | t(h) | Solvent | Yield % [a] |
|---|---|---|---|---|---|---|
| $Bu_2SnCl_2$ | Mg | B | −5 | 2 | THF | 83 (40/60) |
| $Bu_2SnCl_2$ | Mg | A | 60 | 1 | THF | 90 (45/55) |
| $Bu_2SnCl_2$ | Mg | C | 10 | 0.2 | THF | 75 (70/30) |
| $Bu_2SnCl_2$ | Li | B | 60 | 1 | THF | 71 (45/55) |
| $Bu_2SnCl_2$ | Mg | B | 40 | 1 | $Et_2O$ | 50 (40/60) |

-continued

| $R_2SnCl_2$ | Metal | Activation | T(° C.) | t(h) | Solvent | Yield % (a) |
|---|---|---|---|---|---|---|
| $Bu_2SnCl_2$ | Na | — | 110 | 3 | Tol. | 50 (40/60) |
| $Oct_2SnCl_2$ | Mg | A | 60 | 1 | THF | 86 (30/70) |

EXAMPLE 6

Cyclopoly(dialkylstannane)

Stability in emulsion of compounds containing tin-tin bonding. After preparing the emulsion in a life flask under argon with vigorous stirring, the tin compound is added dropwise to a polyvinyl alcohol containing 10% water (sold under the trademark Rhodoviol) which has been degassed beforehand. After 15 minutes, the medium is diluted with degassed water and, after stirring for 30 minutes, the tin emulsion is transferred into a Schlenck tube under argon for storage. After ten days the spectrum of the preparation stored under nitrogen is reacquired. No modification could be observed in any spectrum when compared with the initial spectrum.

Procedure to manufacture the products tested in the above examples and procedure for the various measurements made.

Di(acyloxy)dialkylstannanes

The di(acyloxy)dialkylstannanes are obtained by reaction between an oxodialkylstannane $R_2SnO$ and a carboxylic oxide $R'CO_2H^{(15)}$: 0.05 mol of oxodialkylstannane in suspension in cyclohexane and 0.1 mol of carboxylic acid are introduced into a 250 ml round-bottomed flask. The flask, fitted with apparatus of Dean-Stark type, is brought to 100° C. The water formed during the reaction is removed as it forms, by azeotropic distillation. The heating is maintained for as long as the azeotrope distills off.

Di(acetyloxy)dibutylstannane, $Bu_2Sn(OCOCH_3)_2$
    B.p.$_{10}$=144° C. Yield=85%
    $^1$H NMR: 0.9–1.65 (18H, m); 2.0 (6H, s)
    $^{119}$Sn NMR: −156.3

Di(lauroyloxy)dibutylstannane, $Bu_2Sn(OCOC_{11}H_{23})_2$
    $^1$H NMR: 0.9–1.60 (60H, m); 2.2 (4H, t)
    $^{119}$Sn NMR: −152.5

Di(ethylhexanoyloxy)dibutylstannane
    $Bu_2Sn(OCOCH(Et)(Bu))_2$
    M.p.=54° C.
    $^1$H NMR: 0.9–2.0 (46H, m); 2.0–2.5 (4H, t)
    $^{119}$Sn NMR: −154.7

Di(versatyloxy)dibutylstannane, $Bu_2Sn(OCOC_9H_{19})_2$
    B.p.$_{.7}$=155° C. Yield=85%
    $^1$H NMR: 0.8–2.0 (56H, m)
    $^{119}$Sn NMR: −162.6

Di(acetyloxy)dioctylstannane, $Oct_2Sn(OCOCH_3)_2$
    $^1$H NMR: 0.9–17.0 (34H, m); 2.0 (6H, t)
    $^{119}$Sn NMR: −156.8

Di(lauroyloxy)dioctylstannane, $Oct_2Sn(OCOC_{11}H_{23})_2$
    M.p.=25° C.
    $^1$H NMR: 0.9–2.4 (80H, m)
    $^{119}$Sn NMR: −153.1

Di-(2-ethylhexanoyloxy)dioctylstannane
    $Oct_2Sn(OCOCH(Et)(Bu))_2$
    M.p.=13–15° C.
    $^1$H NMR: 0.9–2.5 (64H, m)
    $^{119}$Sn NMR: −157.9

Di(versatyloxy)dioctylstannane, $Oct_2Sn(OCOC_9H_{19})_2$
    $^1$H NMR: 0.9–2.5 (72H, m)
    $^{119}$Sn NMR: −151.5

1,2-Di(acyloxy)tetraalkyldistannanes

The distannanes are obtained by decomposition of the mixed hydrides $R_2Sn(OCOR')H$ or by exchange starting with 1,2-dichlorotetrabutyldistannane with sodium or potassium salts.

1. By Decomposition

A dialkylstannane and a di(acyloxy)dialkylstannane are mixed together, in stoichiometric amount, in a Schlenck tube under nitrogen. A release of hydrogen is observed immediately. The reaction may be accelerated by heating (60° C.) or by addition of bis(triphenylphosphine)palladium (II) chloride (0.1%) as catalyst. The distannanes are obtained with a purity of greater than 95%.

2. By Exchange

Dibutylstannane and dichlorodibutylstannane are mixed together, in stoichiometric amount, in degassed pentane in a Schlenck tube under nitrogen. After a few minutes, bis(triphenylphosphine)palladium (II) chloride (0.1%) is added as catalyst. When the release of hydrogen is complete, a large excess of an acid salt $R'CO_2M$ (M=Na, K) is added and the mixture is left stirring for 30 min After filtration of the precipitated salts, the distannane is obtained with a purity of greater than 99%.

3. Analyses 1,2-Di(acetyloxy)tetrabutyldistannane, $[Bu_2SnOCOCH_3]_2$
    $^1$H NMR: 0.9–1.65 (36H, m); 1.9 (6H, s)
    $^{119}$Sn(CDCl$_3$) NMR: −126.8 ($^1$J(SnSn)=11272 Hz)

1,2-Di(lauroyloxy)tetrabutyldistannane $[Bu_2SnOCOC_{11}H_{23}]_2$
    $^1$H NMR: 0.8–1.8 (78H, m); 1.9–2.3 (4H, s)
    $^{119}$Sn NMR: −135.8 ($^1$J(SnSn)=11662 Hz)

1,2-Di(2-ethylhexanoyloxy)tetrabutyldistannane
    $[Bu_2SnOCOCH(Et)(Bu)]_2$
    M.p.=24° C.
    $^1$H NMR: 0.8–1.8 (72H, m); 1.9–2.3 (2H, s)
    $^{119}$Sn NMR: −140.0 ($^1$J(SnSn)=10857 Hz)

1,2-Di(versatyloxy)tetrabutyldistannane
    $[Bu_2SnOCOCtC_9H_{19}]_2$
    $^{119}$Sn NMR: −142.1 ($^1$J(SnSn)=11863 Hz)

1,2-Dilauroyloxy)tetraoctyldistannane
    $[Oct_2SnOCOOC_{11}H_{23}]_2$
    $^{119}$Sn NMR: −140.0 ($^1$J(SnSn)=11662 Hz)

1,2-Dichlorotetrabutyldistannane, $[Bu_2SnCl]_2$
    $^{119}$Sn NMR: +110.1 ($^1$J(SnSn)=2465 Hz)

1,3-Di(acyloxy)tetraalkyldistannoxanes, $[R_2Sn(OCOR')]_2O$

The distannoxanes are obtained by reaction between an oxodialkylstannane and a carboxylic acid in toluene (2h, 110° C.). These compounds are, in fact, in the form of dimers which differentiate the tins.

The tin atoms are thus not equivalent and 2 different signals are thus observed on $^{119}$Sn NMR. Furthermore, the presence of a very minor signal corresponding to the monomer (2 equivalent tins) is generally noted.

1,2-Di(acetyloxy)tetrabutyldistannoxane
    M.p.=57° C.
    $^1$H NMR: 0.9–1.7 (78H, m); 1.9 (6H, s)
    $^{119}$Sn NMR: −132.3 (monomer); −215.3, −226.6 (dimer)
    $^2$J(SnSn)=112 Hz 1,2-Di(lauroyloxy)tetrabutyldistannoxane
    $^1$H NMR: 0.8–1.7 (78H, m); 1.9–2.3 (4H, s)
    $^{119}$Sn NMR: −134.9; −217.4; −226.6
    $^2$J(SnSn)=113 Hz 1,2-Di(2-ethylhexanoyloxy)tetrabutyldistannoxane
    M.p.=130° C.
    $^1$H NMR: 0.7–2.4 (66H, m)
    $^{119}$Sn NMR: −152.0; −211.1; −223.0

1,2-Di(vereatoyloxy)tetrabutyldistannoxane
$^{1}$H NMR: 0.8–1.8 (74H, m)
$^{119}$Sn NMR: −143.5; −222.5; −228.5
1,2-Di(acetyloxy)tetraoctyldistannoxane
$^{1}$H NMR: 0.7–1.7 (68H, m); 1.9 (6H, s)
1,2-Di(lauroyloxy)tetraoctyldistannoxane
M.p.=38° C.
$^{1}$H NMR: 0.7–2.2 (114H, m)
1,2-Di(2-ethylhexanoyloxy)tetraoctyldistannoxane
M.p.=52° C.
$^{1}$H NMR: 0.7–2.2 (98H, m)
$^{119}$Sn NMR: −202.2; −211.0
1,2-Di(versatoyloxy)tetraoctyldistannoxane
$^{1}$H NMR: 0.7–1.7 (106H, m)

4-Poly(dialkylstannanes)

For the preparation of these very oxygen-sensitive compounds, all the operations described below are performed under nitrogen and all the solvents used are degassed beforehand.

4.1-1. By Catalysed Decomposition 4.7 g of dibutylstannane are introduced into a Schlenck tube containing 10 ml of a degassed solvent (pentane or THF), followed by addition of a spatulaful (10 mg) of bis(triphenylphosphine)palladium II chloride (<0.1%). In the absence of light, the decomposition is continued until the release of hydrogen has totally disappeared.

4.2-2. By Reduction of a Dichlorodialkylstannane 4.2-1. Process A: Activation with 1,2-dibromoethane 10 g of magnesium in 20 ml of the desired solvent are introduced into a grignard, followed by 0.5 ml of 1,2-dibromoethane: a release of gas and heating of the medium then take place. When the release ceases, 40 mmol of dichlorodialkylstannane in solution in the solvent, to which is added 1 ml of 1,2-dibromoethane, are introduced. After addition, the mixture is maintained at reflux for 1 h.

4.2-2. Process B: Ultrasound

The reaction solvent and metal are introduced into a reactor provided for this purpose. The ultrasound is switched on for 30 min and the dichlorodialkylstannane is added.

After addition, the ultrasound is again switched on until the end of the reaction.

4.2-3. Process C: Mechanical Activation 10 g of magnesium are introduced, without solvent and with magnetic stirring using a magnetic bar, into a flamed grignard under nitrogen. After 48 h, the flask is coated with a mirror of tin and the metal is very finely divided. The solvent is then added, followed by the dichlorodialkylstannane (very exothermic reaction).

4.2-4. General Procedure for Purification of the poly(dialkylstannanes)

Degassed petroleum ether (100 ml) is added to the reaction medium, which is filtered under nitrogen and transferred into a Schlenck tube; 50 ml of degassed water are next added and the organic phase is then separated out and dried over MgSO$_4$, and the solvents are evaporated off. The poly(dialkylstannanes) are collected in the form of yellow-ochre viscous oils.

5-Test of the Catalysts as Simplified Mixtures 5.1 SiH/SiOH Condensation

The mixtures are made from:

23 g of alpha, omega-dihydroxylated polydimethylsiloxane silicone oil;

1 g of polydimethylsiloxane containing 1.5% by weight of SiH unit;

0.712 millimol of tin-based catalyst.

The mixtures are homogenized and brought to the temperature indicated; the gel time corresponds to the time at the end of which it is no longer possible to draw a thread at the surface of the mixture.

5.2 SiOH/Si(OPr)$_4$ Condensation

To 60 g of alpha, omega-dihydroxylated oil containing 0.3% water is added the crosslinking system composed of 0.84 g of propyl silicate and 1.14 mmol of stannylated compound (or equivalent). The whole is mixed with a spatula for one minute. The instant t=0 corresponds to the moment at which the mixing is stopped. For the distannanes, the oil is degassed beforehand.

5.3 SiOH/Si40 Condensation 1.24 mmol of tin compound is mixed with 4 g of "Si40". A 0.36 g sample of this premix is added to 20 g of alpha, omega-dihydroxylated oil. The whole is mixed and tested.

5.4 Polyurethanes

The following are introduced into a Buchner flask:

5.26 g of polyethylene glycol of mass 1000

0.80 g of 1,4-butanediol.

1 ml of a solution of 0.15 g of stannylated compound in 50 ml of anhydrous ether is added to this degassed mixture. The solvent is evaporated off under vacuum and 3.94 g of 3-isocyanatomethyl-3,5,5-trimethylcyclohexylisocyanate are then added. The final mixture is poured into a cylindrical mould 2 cm in diameter by 0.5 cm in height.

5.5 Use as a Catalyst for Unmasking Polyisocyanates Masked with Dimethylpyrazole Trimers (that is to say hexamethylene diisocyanates trimerized in order to give isocyanuric ring) masked with 3,5-dimethylpyrazole are used.

One batch of masked polyisocyanates of molecular weight 792.98 containing 0.258 mol %/g of masked isocyanate group is subjected to the following procedures:

dilution of 80.01 g of the batch with 8.24 of solvesso;

test sample of 2 g of solution (i.e. 4.7 mmol of masked isocyanate function);

addition of 0.61 g of 1-octanol (4.7 mmol);

addition of 50 mg of catalyst;

reaction in the presence of atmospheric oxygen.

The above reactants are mixed together at room temperature and the temperature is brought to 80° C. over 15 min and then maintained at 80° C. for 6 hours.

The results are collated in the following table:

| CATALYST TESTED | DEGREE OF CONVERSION OF THE OCTANOL | OBSERVATIONS ON THE SOLUTION AFTER REACTION |
|---|---|---|
| Cyclopoly(dialkylstannanes) Ex. 4: Sn$_5$/Sn$_6$ = 70/30 | 35% | Clear, very pale yellow + cloudiness |
| Di(lauroyloxy)tetrabutyl-distannane [Bu$_2$SnOCOC$_{11}$H$_{23}$]$_2$ | 50% | Clear, little or no colour |
| Di(acetyloxy)tetrabutyl-distannane [Bu$_2$SnOCOC$_{11}$H$_{23}$]$_2$ | 49% | |
| Dibutyltin oxide | 13% | |
| None | 0% | |

The results obtained are quite exceptional, the catalysts according to the invention being among the best of those treated, despite a relatively high molecular mass. The good activity should also be noted, despite its insolubility of dibutyltin oxide, which is a by-product of the products according to the invention by oxidation. As a guide, it should be mentioned that the temperature of release of this type of blocking agent is about 140° C. when they are attached to isocyanates borne by sp$^3$-hybridized carbons.

5.6 Use as a Catalyst for Unmasking Polyisocyanates Masked with Methyl Ethyl Ketoxime (MEKO)

Trimers (that is to say hexamethylene diisocyanates trimerized in order to give isocyanuric ring) masked with methyl ethyl ketoxime (MEKO) are used.

An aliquot of polyisocyanates masked with methyl ethyl ketoxime is diluted with 10% by mass of solvesso and introduced into a reactor with the same molar amount of 1-octanol and 50 mg of the catalyst.

The above reactants are mixed together at room temperature and gradually brought to 80° C. over 15 min and the temperature is maintained at 80° C. for 6 hours in the presence of atmospheric oxygen.

The results are collated in the following table:

| CATALYST TESTED | DEGREE OF CONVERSION OF THE OCTANOL | OBSERVATIONS ON THE SOLUTION AFTER REACTION |
|---|---|---|
| Cyclopoly(dialkylstannanes) Ex. 4: $Sn_5/Sn_6$ = 70/30 | 4% | Clear, very pale yellow + cloudiness |
| Di(lauroylaxy)tetrabutyl-distannane $[Bu_2SnOCOC_{11}H_{23}]_2$ | 3% | Clear, little or no colour |
| Di(acetyloxy)tetrabutyl-distannane $[Bu_2SnOCOC_{11}H_{23}]_2$ | 1% | |
| Dibutyltin oxide | 9% | Insoluble |
| None | 0% | |

The above results are significant since the conditions prevailing in the reactor are not very favourable to oxidation of the catalyst precursors. The fairly high activity of one of the products of oxidation of the said latent catalysts should be noted. In order better to appreciate the noteworthy effect of the latent catalysts on the present invention, it should be emphasized that the temperature of release of such isocyanates masked with oximes is about 160° C. The fact that tests at 80° C. give a certain level of release demonstrate a noteworthy activity of the catalysts according to the present invention.

What is claimed is:

1. A latent ploycondensation catalyst of the formula:

$$R_1—Y_n—R_4 \quad (I)$$

wherein:
the radicals Y, identical or different, represent a tin-membered chain unit of structure:

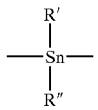

wherein R' and R", identical or different are a hydrogen atom or a hydrocarbon radical, and $R_1$ and $R_4$ identical or different are a hydrogen atom, a hydrocarbon radical, at least one of the $R_1$ and R4 group being linked to tin of the tin-membered chain $Y_n$ through a chalcogen atom, and n is at least equal to 2.

2. A latent polycondensation catalyst according to claim 1, wherein the chalcogen atom is oxygen.

3. A latent polycondensation catalyst according to claim 2, wherein R1 or R4 comprising the oxygen are alkoxy.

4. A latent polycondensation catalyst according to claim 2, wherein R1 or R4 comprising the oxygen are acyloxy.

5. A latent polycondensation catalyst according to claim 1, wherein the said at least one of the radicals $R_1$ and $R_4$ has branching alpha, beta or gamma to said chalcogen bearing the bond connecting the said radical to tin.

6. A latent polycondensation catyst according to claim 1, wherein the radical $R_1$ is aryl, alkyl, or aralkyl, and the number of its carbon atoms is not more than 20.

7. A latent polycondensation catalyst according to claim 1, wherein the radical $R_4$ is aryl or alkyl, or aralkyl, and the number of its carbon atoms in not more than 20.

8. A latent polycondensation catalyst according to claim 1, wherein the radical $R_1$ has branching alpha, beta or gamma to the bond connecting said radical $R_1$ to tin.

9. A latent polycondensation catalyst according to claim 8, wherein the said alpha, beta or gamma branching corresponds to a tertiary radical.

10. A latent polycondensation catalyst according to claim 1, wherein the radical $R_4$ has branching alpha, beta or gamma to the bond connecting the said radical $R_4$ to tin.

11. A latent polycondensation catalyst according to claim 10, wherein the said alpha, beta or gamma branching corresponds to a tertiary radical.

12. A latent polycondensation catalyst according to claim 1, wherein at least one of the radicals R' has a number of carbon of not more than 20.

13. A latent polycondensation catalyst according to claim 1, wherein at least one of the radicals R" has a number of carbon of not more than 20.

14. A latent polycondensation catalyst of formula (II):

$$R_1—(Q)_n—R_4 \quad (II)$$

wherein:
radicals R1 and R4 identical or different are a hydrogen atom, or a hydrocarbon radical, Q is a divalent radical of structure —Z—Y— wherein radicals Y, identical or different, represent a tin-membered chain unit of structure:

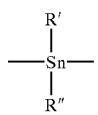

wherein R' and R", identical or different are a hydrogen atom or a hydrocarbon radical, and wherein Z represents an oxygen atom or a simple bond with a preceding chain unit Y or with $R_1$, and n is greater than 2, with the proviso that at least two of the groups Z are oxygen.

15. A reactant useful as a catalyst for the release of masked isocyanate and as a polycondensation catalyst, having:
at least one tin derivative; and
an oxidation agent bearing oxygen atom selected from the group consisting of halogenates, peroxides, and oxygen-containing gases, wherein said tin derivative is a latent polycondensation catalyst of the formula:

$$R_1—Y_n—R_4 \quad (I)$$

wherein:
the radicals Y, identical or different, represent a tin-membered chain unit of structure:

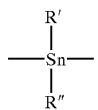

wherein R' and R", identical or different are a hydrogen atom or hydrocarbon radical, and $R_1$ and $R_4$ identical or different are a hydrogen atom, a hydrocarbon radical, at least one of the $R_1$ and R4 group being linked to tin of the tin-membered chain $Y_n$ through a chalcogen atom, and n is at least equal to 2.

* * * * *